US005999406A

United States Patent [19]
McKain et al.

[11] Patent Number: 5,999,406
[45] Date of Patent: Dec. 7, 1999

[54] DOCKABLE ELECTRONIC EQUIPMENT CONTAINER

[75] Inventors: James A. McKain, Andover; Peter Fasciano, Natick, both of Mass.; Alan Denny, Fountain Valley; Raymond W. Imblum, Corona, both of Calif.; Mark A. Sprague, Bolton, Mass.; Robert F. Deal, North Grafton, Mass.; Morton Tarr, Bolton, Mass.

[73] Assignee: Avid Technology, Inc., Tewksbury, Mass.

[21] Appl. No.: 08/953,151

[22] Filed: Oct. 17, 1997

Related U.S. Application Data

[63] Continuation of application No. 08/609,764, Feb. 23, 1996, abandoned, which is a continuation of application No. 08/418,631, Apr. 7, 1995, abandoned, which is a continuation of application No. 08/392,536, Feb. 23, 1995, abandoned, which is a continuation of application No. 08/851,483, May 5, 1997, abandoned, which is a continuation of application No. 08/418,631, Apr. 7, 1995, abandoned, which is a continuation of application No. 08/702,152, Aug. 23, 1996, abandoned, which is a continuation of application No. 08/392,536, Feb. 23, 1995, abandoned.

[51] Int. Cl.⁶ ................................................ H05K 7/20
[52] U.S. Cl. .................. 361/704; 361/688; 361/690; 361/715; 361/816; 165/80.3; 312/223.1; 439/138; 439/248
[58] Field of Search ................................ 361/683, 685, 361/687, 688, 690, 704, 709, 715, 816; 439/138, 248; 165/80.3; 312/223.1

[56] References Cited

U.S. PATENT DOCUMENTS

| | | |
|---|---|---|
| 2,278,280 | 3/1942 | Pfeiffer et al. ........................ 439/138 |
| 4,061,228 | 12/1977 | Johnson . |
| 4,414,576 | 11/1983 | Randmae ............................... 348/373 |
| 4,507,689 | 3/1985 | Kozuki . |
| 4,550,343 | 10/1985 | Nakatani . |
| 4,763,225 | 8/1988 | Frenkel et al. ........................ 361/690 |
| 4,856,656 | 8/1989 | Sugimoto et al. ..................... 206/523 |
| 4,893,210 | 1/1990 | Mintzlaff ............................... 360/137 |
| 4,926,291 | 5/1990 | Sarraf .................................... 361/685 |
| 5,258,888 | 11/1993 | Korinsky ............................... 361/704 |
| 5,372,515 | 12/1994 | Miller et al. .......................... 439/138 |
| 5,392,197 | 2/1995 | Cuntz et al. .......................... 361/818 |
| 5,408,383 | 4/1995 | Nagasaka et al. . |
| 5,808,866 | 9/1998 | Porter ................................... 361/695 |
| 5,812,373 | 9/1998 | Hwang ................................. 361/704 |

FOREIGN PATENT DOCUMENTS

| | | |
|---|---|---|
| 0210497 | 2/1987 | European Pat. Off. . |
| 4304506A1 | 8/1993 | Germany . |
| 93/24932 | 12/1993 | WIPO . |
| WO93-24932 | 12/1993 | WIPO . |

*Primary Examiner*—Leo P. Picard
*Assistant Examiner*—Boris L. Chervinsky
*Attorney, Agent, or Firm*—Wolf, Greenfield & Sacks, P.C.

[57] ABSTRACT

A dockable equipment container includes an outer shell of a durable material and an inner metallic container. The inner c,ontainer is suspended within the outer shell by blocks of energy absorbent material, such as SORBATHANE. The dockable equipment container further includes a connector at one end, which is covered by a protective door. When mated with external equipment, the protective door is moved to an open position by an alignment device, such as alignment pins, pressing against an end of the protective door. The alignment pins mate with corresponding alignment holes for ensuring that the connector properly mates with a corresponding connector in the external equipment. The dockable equipment container may contain various electronic equipment, which conmmunicates with the external equipment through the connector. The electronic equipment may include disk drives, which are protected from the environment and from shock by the construction of the dockable equipment container.

25 Claims, 9 Drawing Sheets

DOCKABLE ELECTRONIC EQUIPMENT CONTAINER

CROSS-REFERENCE TO RELATED APPLICATIONS

This is a continuing application which claims the benefit under 35 U.S.C. of § 120 of: U.S. application Ser. No. 08/609,764, filed Feb. 23, 1996 pending, which is a continuing application of U.S. application Ser. No. 08/418,631, filed Apr. 7, 1995, abandoned, which is a continuing application of U.S. application Ser. No. 08/392,536, filed Feb. 23, 1995, abandoned; and U.S. application Ser. No. 08/851,483, filed May 5, 1997, pending, which is a file wrapper continuation of U.S. application Ser. No. 08/418,631, filed Apr. 7, 1995, abandoned; and U.S. application Ser. No. 08/702,152, filed Aug. 23, 1996, pending, which is a file wrapper continuation of U.S. application Ser. No. 08/392,536, filed, Feb. 23, 1995, abandoned, all of which are hereby incorporated by reference.

FIELD OF THE INVENTION

This invention relates generally to moving picture recording devices and processes. The invention is more specifically related to containers for recording media, communication equipment and the like used in connection with moving picture recording devices.

BACKGROUND OF THE INVENTION

Present day video recorders are typically a combination of a video camera with a video tape recorder which are constructed so as to be portable. They are often called camcorders or video tape recorders (VTRs). For the purposes of this application, they are referred to as video tape recorders. All of the present day portable video tape recorders known to the inventors use a video tape, usually contained within a cassette, as the recording medium. Recording is done in numerous formats, including analog BETA and VHS format, and the digital D1 format. A major disadvantage of video tape recorders is that video tape allows only linear access to a given point on the video tape. That is, if the tape has just finished recording, in order to access the beginning of a recorded session located at the beginning of the tape, the tape must be rewound. A further disadvantage of VTRs is that the physical medium, i.e. the tape, must generally be transported back to a studio for editing and broadcast, or the content transmitted to a studio facility.

The problem of linear access to video tape recordings is most evident in the field of broadcast television news. Typically, a reporting crew will go to a news location with a video tape recorder and record an event. Upon completion of recording, the tape must be rewound and then played back and transmitted, for example via satellite or microwave link, to a base station in a studio facility, where it is again recorded. At the base station, the re-recorded information can then be edited into a final news program.

Editing of moving pictures is commonly done digitally, using a non-linear computer-based editing system such as the Avid/1 Media Composer available from Avid Technology, Inc. of Tewksbury, Mass. Such a system typically requires digitization, or, conversion of analog video signals into a digital, computer-readable format. Even if the video signal is from digital video tape, linear access to the tape still presents the same problems. Tape recording, transmission and digitization are usually performed unless there is an actual live connection from the camera to the base station. Because of the delays in rewinding, playback and transmission of recorded information from a video tape, there is typically a half hour delay between the completion of recording of an event and the time an edited version of the recorded event can actually be broadcast by the base station. This delay is a significant competitive problem in broadcast news where the time to air is very important and stations strive to produce "up to the minute" news coverage and broadcast.

Today, electronic still cameras exist which record a still image on a digital magnetic medium, such as a floppy disk. Such a camera is described in U.S. Pat. No. 5,084,775, issued Jan. 28, 1991, and assigned to Sony Corporation. However, the camera described in that patent records still images only, not full motion video images. In addition, computer video capture systems exist, such as the NuVista video capture card available from RasterOps/Truevision, Inc. Such systems, however, have not been reduced to the portable form of the present invention to perform live digital capture directly from a camera.

Additionally, it has been recently suggested by those skilled in the field of moving picture recording that numerous problems with a non-linear digital moving picture recorder are insurmountable. In particular, it has been suggested that there is a large image quality trade-off with increased recording time capability. Additionally, it has been suggested that, using disk-based media, a little shake of the camera would cause a disk crash. Finally, it has been suggested that the disk media is substantially costlier than tape.

SUMMARY OF THE INVENTION

The present invention overcomes the above problems by replacing the conventional video tape with electronic equipment in a ruggedized, dockable container, holding for example, a digital, computer-readable and writable random-access recording medium, such as a magnetic or optical disk. In one embodiment, by providing a smaller sized disk-drive, e.g. two and one-half inches in diameter, and shock and vibration isolation packaging, the risk of damage or disk failure is significantly reduced. Additionally, broadcast quality video can be provided by a compressed stream of digital moving picture information at rates of four megabytes per second (4 Mbps). In one embodiment of this invention, the disk-based recording media can record about 10 minutes of continuous video.

By providing a portable video recorder which records directly onto a digital, computer-readable and writable random-access (i.e., non-linear) medium, there is no longer any need for delays due to rewinding the tape, or for digitization of the video tape. With the advantages of non-linear recording and non-linear editing, further in combination with a non-linear broadcast system, the time to broadcast of a news event can be drastically reduced. This reduction in the time to broadcast provides a significant competitive advantage for a broadcast news station.

Accordingly, one aspect of the present invention is a digital, computer-readable and writable random-access recording medium which can be removably mounted in and attached to various equipment, including a moving picture recorder producing a sequence of digital images for storing on the medium in a computer-readable file format.

In one embodiment, the digital recording medium is a disk-type drive. In this embodiment, the disk-type drive is mounted in a dockable housing which is detachable from the various equipment. The housing may be ruggedized.

Another aspect of the present invention is a communication equipment set which can also be removably mounted in and attached to various equipment, including the moving picture recorder producing the sequence of digital images. The communication equipment set could then transmit the sequence of digital images directly to a transmission network or editing base station, as desired.

Thus, in another embodiment, there is provided a high frequency radio set mounted in a dockable housing which is detachable from the various equipment. As in the case of the disk-type drive, the housing may be ruggedized.

BRIEF DESCRIPTION OF THE DRAWINGS

In the Figures.

DETAILED DESCRIPTION

The present invention will be more completely understood through the following detailed description which should be read in conjunction with the attached drawing in which similar reference numbers indicate similar structures.

Figure 1:
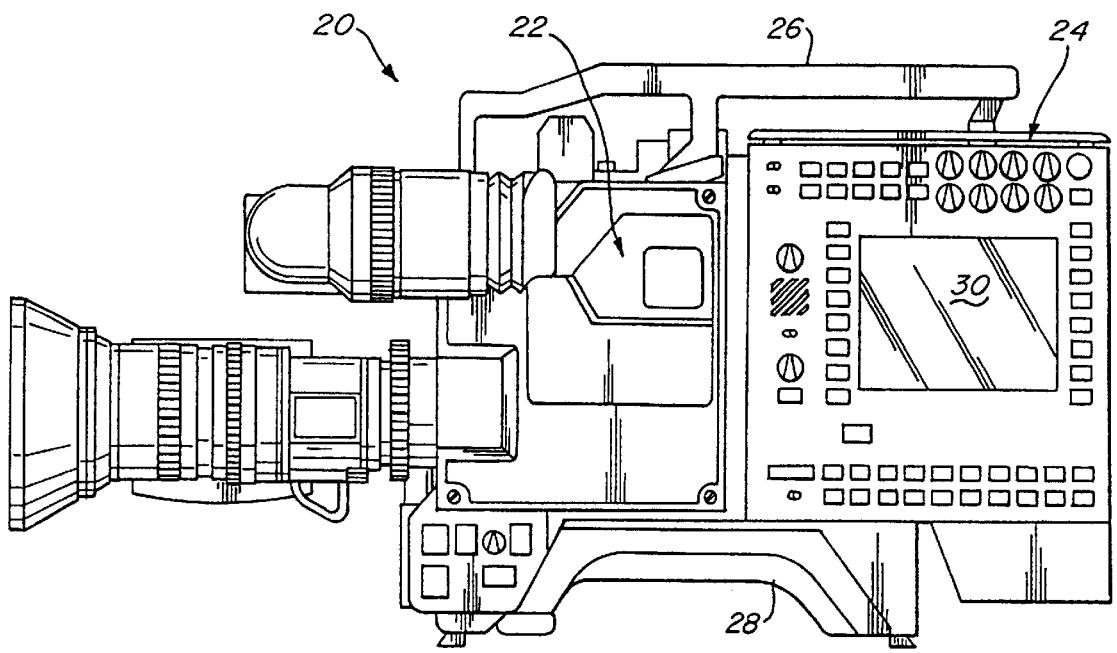
FIG. 1 is a side elevation of a video camera/recorder.

FIG. 1 shows a video camera/recorder 20 which includes a combination of a video camera 22 and a video recorder 24. The camera may be one of many types of video cameras, and may be, for example, either the HL-57 camera made by Ikegami Corporation of Japan, or the "400" camera made by the Sony Corporation of Japan. The video camera/recorder 20 also typically has a handle 26 and shoulder support 28. On the video recorder 24 of the device, typically a display 30 is used to provide the user status and other pertinent information. The camera electronic circuitry and recording medium may be in one piece, such that the camera 22 and recorder 24 are integrated, or may be in two pieces such that the camera 22 and recorder 24 are separable from each other. Many tape-based recorders used for news reporting are in such a two-part form, and often take the shape as shown in Japanese utility model 63-9907, also referred to as 56-134889, or Japanese patent 61-187165.

The output of the video camera is generally an analog video signal. Presently known cameras available from Ikeganii have a 79-line bus for the purposes of communicating with a recorder, whereas Sony cameras use a 52-line bus. The recorder of the present invention provides physical and electrical connections to interface with the Ikegami, Sony or other bus, so that the moving picture recorder of the present invention receives, using teclmiques known in the art, the output of the camera as if the recorder were a videocassette recorder. The moving picture recorder also includes, using techniques well known to those skilled in the art, electrical contacts and connections (not shown) to turn the camera on and off, initiate recording, etc.

Figure 2:
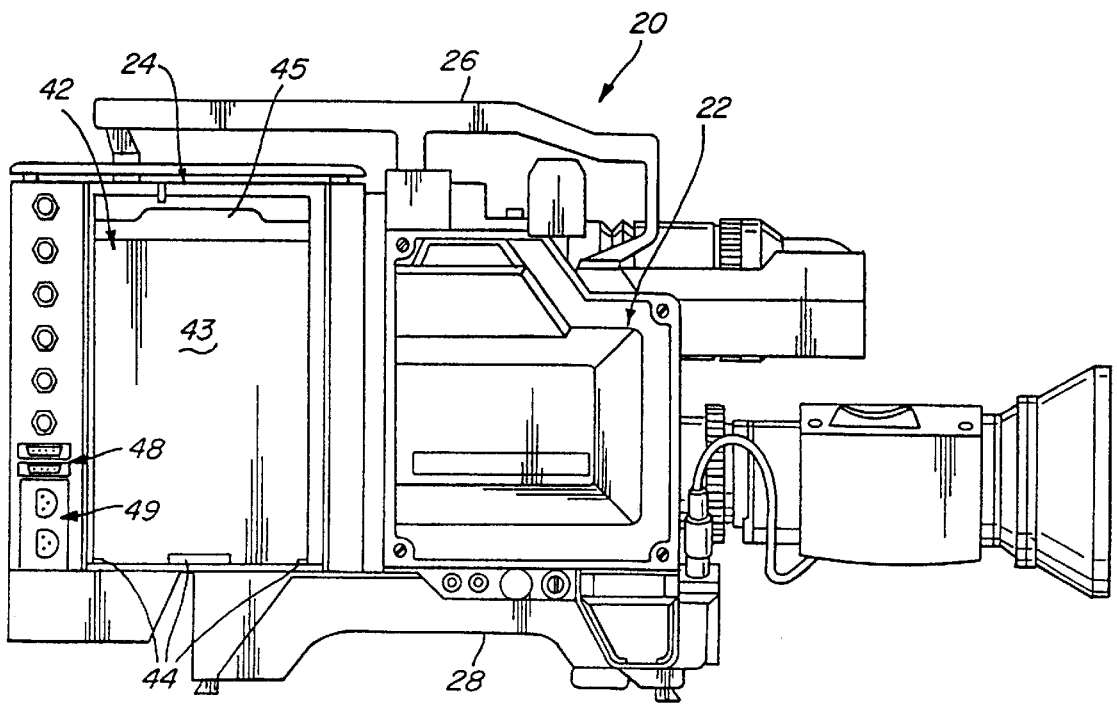
FIG. 2 is an opposite side elevation of the camera of FIG. 1.

FIG. 2 shows the opposite side view of the camera shown in FIG. 1. On this side of the camera is found the recording media compartment 42 which is accessed via a door 43. External connections, such as 48 and 49, can provide external video output, ETHERNET or other kinds of connections.

Figure 3:
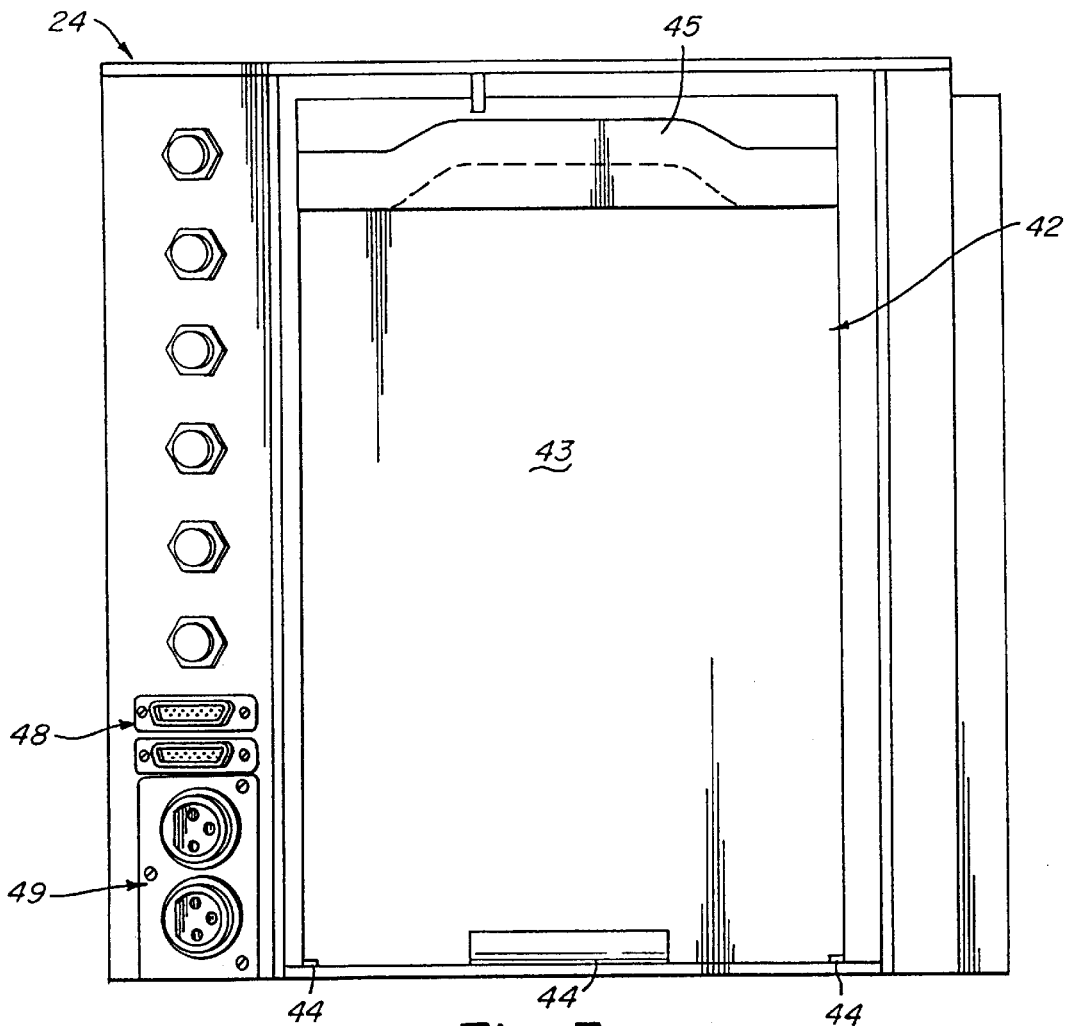
FIG. 3 is a more detailed view of the door of the recorder of FIG. 2.
Figure 4:
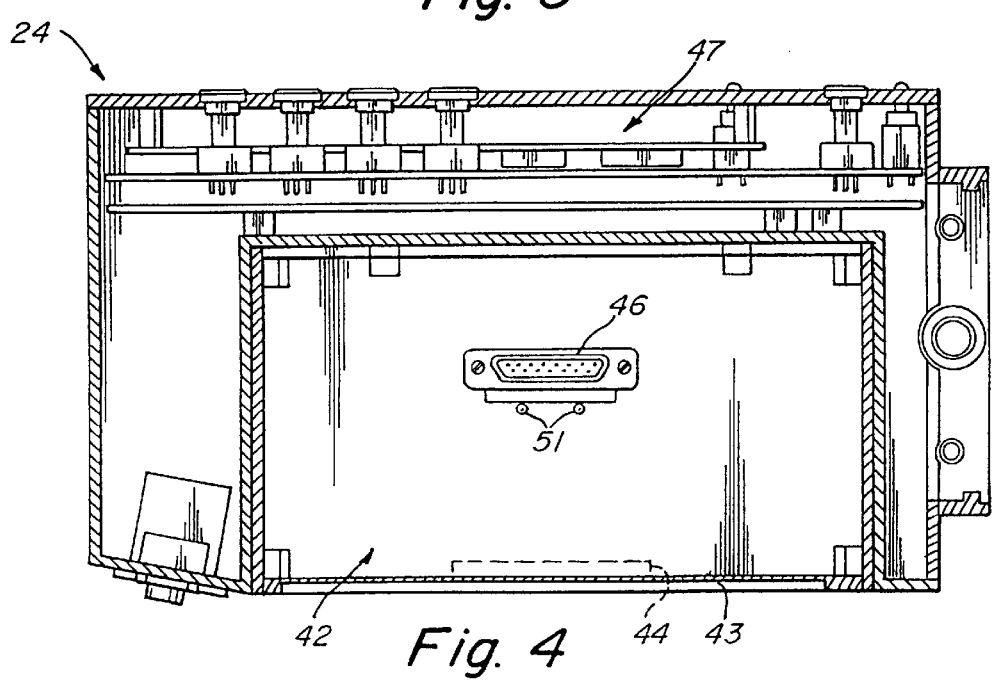
FIG. 4 is an interior plan view of the recording media compartment of the camera of FIGS. 1 and 2.

The door 43 and media compartment 42 are shown in greater detail in FIGS. 3 and 4. The door has a hinged section 44 and a handle 45 so that the door may be opened. Referring now to FIG. 4, a compartment 42 is an opening within the recorder and includes a connector 46 at the bottom of the compartment. The recording media, contained within a dockable equipment container to be described below, connects to this connector 46 to provide electronic connection to the remainder of the circuitry of the recorder, located in area 47.

Figure 5A:
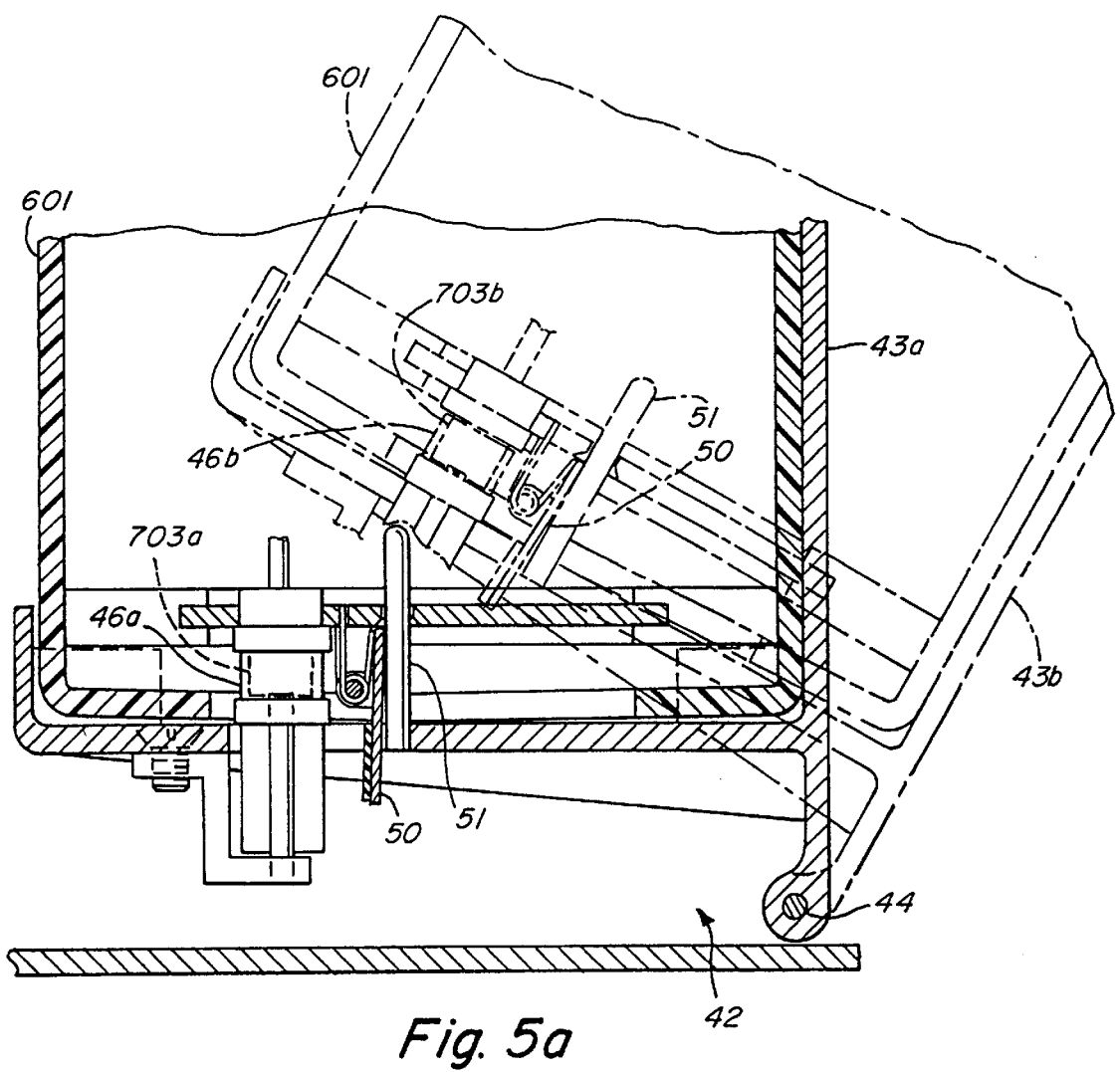
FIGS. 5A and 5B are details of the door and connection between the dockable equipment container and a connector inside the media compartment.
Figure 5B:
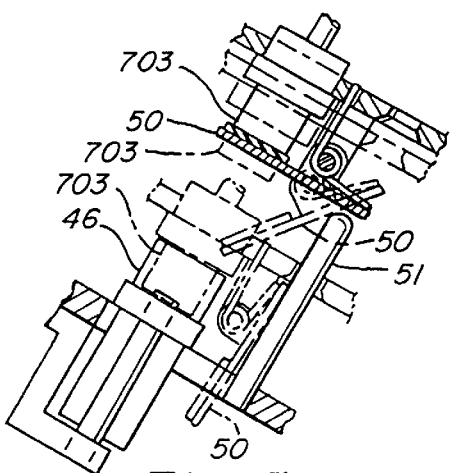

FIG. 5a shows details of the door 43 and how connection is made between the dockable equipment container and the connector 46. In FIG. 5a, the door 43a is closed and the dockable equipment container connector 703a is fully engaged and connected with connector 46a. The door at 43b and connector 46b illustrate the open position at the onset of connection with connector 703b. FIG. 5b illustrates how a hinged protective door 50 on the dockable equipment container rotates when a protrusion 51, near the connector 46, pushes it out of the way upon insertion of the dockable equipment container package. As will be later described, protrusions 51 may be alignment pins.

The cartridge or dockable electronic equipment container is ruggedized for field use and typically has an exterior made of a hard plastic material. Any suitably durable material may be used, including various plastics, hard tubber, fiberglass, metal, etc. Ruggedization allows a disk drive package, communication equipment set or other equipment to withstand the rough treatments of sometimes hostile field environment in which video recorders are used.

Figure 13:
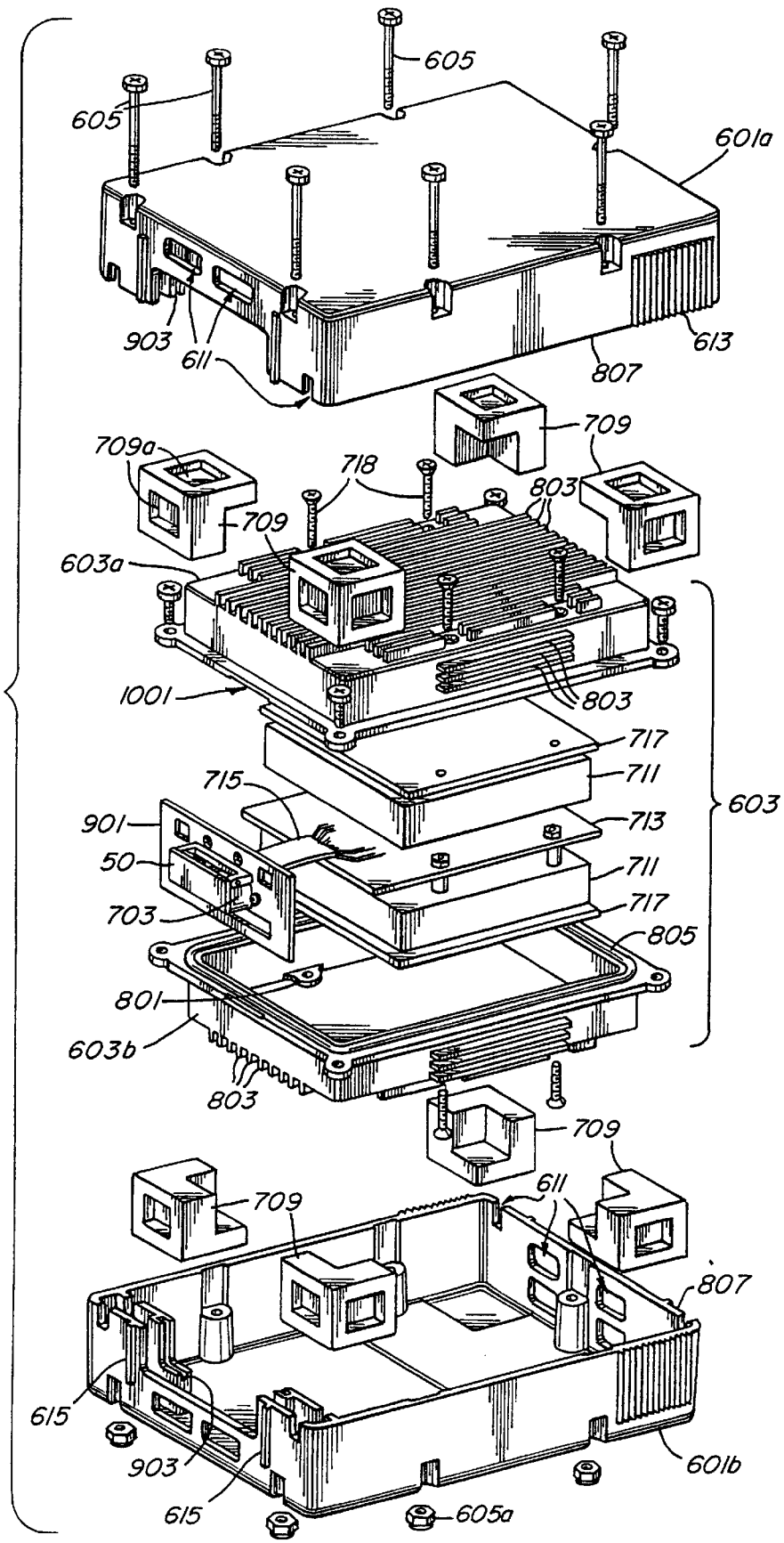
FIG. 13 is an exploded perspective view of the entire dockable equipment container.

In one embodiment of the present invention a disk drive is carried within the cartridge. In the case of the cartridge housing one or more disk drives, the drive package includes thermally conductive material which draws excessive heat away from the package, thereby further reducing potential disk failure. To achieve this, the disk drive package is placed in a packed shell assembly which includes shock and vibration protection mechanisms for the media as well as heat dissipation materials in a manner to be described in connection with FIGS. 7, 8 and 13.

Figure 6:
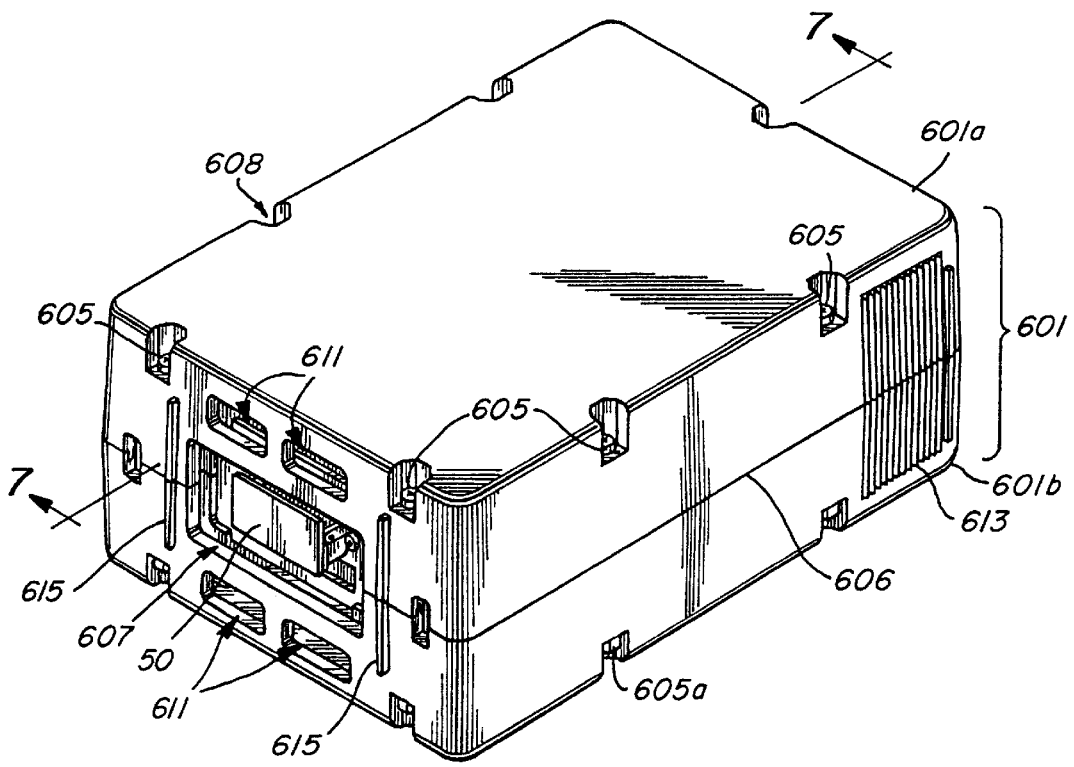
FIG. 6 is a perspective view of the dockable equipment container.

FIG. 6 is a perspective view of one embodiment of the dockable equipment container, showing its general external appearance. As will be explained in greater detail below, there is a hard plastic outer shell 601, of a clamshell design (601a and 601b), and a metal container 603. The clamshell halves 601a and 601b of outer shell 601 are held together by screws 605 or another suitable fastener. When the container of the present invention is used in connection with disk drives and the like, it may be desired that the fasteners (e.g. screws 605 and 605a) be removable, other uses of the container may permit the fasteners to be made permanent (e.g. using rivets or heat stakable features). Indeed, the fasteners could be eliminated in some applications, without departing from the spirit of the invention, by permanently bonding together the edges defining parting line 606 of the outer shell.

The outer shell preferably includes a surface defining a recess 608 located substantially within a range of 1¾"–2" from the outer shell end at which the mounting plate edges are captured. The recess 608 may also permit access to one of the fasteners 605 and 605a mentioned above, or may be separately provided. The location of the recess 608 could be altered without departing from the spirit of the invention, provided the recess 608 is suitable for receiving a catch. As will be explained later, the catch may be provided in a receptacle for the dockable equipment container, to prevent the dockable equipment container inadvertently backing out of the receptacle during use.

The outer shell includes a passage 607 therethrough for providing access to an electrical connector (not seen) covered by protective door 50, and may include additional passages 611 therethrough for providing a flow of cooling air. In order to facilitate handling of the container, ridges 613 are provided at an end opposite the connector. Thus, when the container is inserted and removed from a camera or other equipment, a firm grip may be obtained by the operator. Finally, the container includes ribs 615 for ensuring stability when the container is placed on its end or edges. Further details of the container may be seen by examining a cross-section along line 7—7, as shown in FIG. 7.

Figure 7:
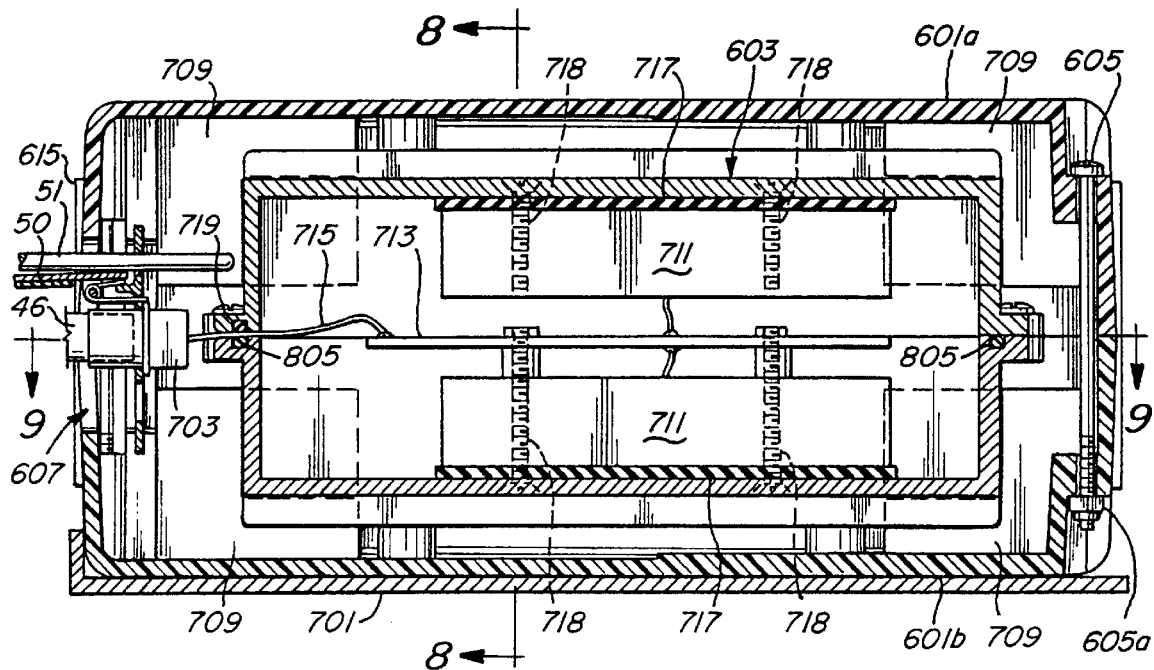
FIG. 7 is a cross-sectional view, taken along line 7—7 of FIG. 6.

FIG. 7 reveals some additional interior components of this embodiment of the dockable equipment container. In this view, the container has been placed into a receptacle having a tray 701 on which the dockable equipment container rests, and in which the connector 703 is in communication with a mating connector 46 in the receptacle.

Here, the outer shell 601 of FIG. 6 is clearly seen to be two distinct clamshell halves 601a and 601b. The outer shells 601a and 601b meet along line 606 defined by edges of clamshell halves 601a and 601b. The placement of connector 703 and protective door 50 within passage 607 is also clearly seen. As will be explained in greater detail, below, protective door 50 is rotated to an open position by an alignment pin 51, so that mating connector 46 may enter.

The metal container 603 is suspended within the outer shell 601 by blocks of energy absorbing material 709, preferably located at corners of the metal container 603. Within the metal container 603 are located one or more pieces of electronic equipment 711. The presently preferred electronic equipment is a pair of disk drives. However, other suitable electronic equipment might include alternative recording devices, high frequency communication gear, and the like, suitable for the storage or processing of moving picture data. The disk drives of the presently preferred embodiment are interconnected through a circuit board 713. The circuit board 713 includes circuits to distribute data to the disk drives 711 using a technique known in the art as striping. By striping the data written to the two disk drives, the data throughput of the combination is essentially doubled. The circuit board 713 communicates with external equipment through the connector 703, to which it is connected by ribbon cable 715.

In order to provide further shock resistance, heat transfer capacity, and environmental protection for the equipment within the container, energy absorbing material 717 may be placed between the disk drives 711 and the metal container 603 walls. It is preferable that energy absorbing material 717 also be of a type which provides good heat transfer characteristics, so that heat generated by operation of the disk drives 713 is dissipated through the walls of metal container 603. As next discussed, energy absorbing material 717 is compressed about mounting screws 718 to seal those openings through which the screws pass.

Figure 8:
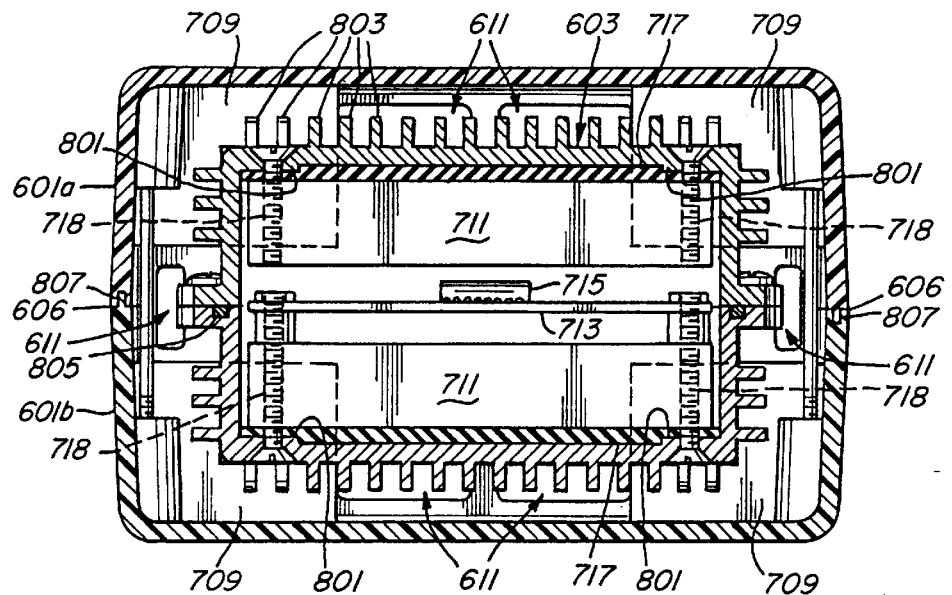
FIG. 8 is a cross-sectional view, taken along line 8—8 of FIG. 7.

In the cross-sectional view of FIG. 8, a number of heat dissipating features are readily seen. The energy absorbing material 717 is again shown to be disposed between disk drives 711 and walls of the metal container 603. The locations in the walls of metal container 603 through which screws 718 pass are disposed within bosses 801, which cause compression of the energy absorbing material 717. Thus, some measure of environmental sealing is achieved around the screws 718. Heat goenerated by the disk drives 711 is passed through the energy absorbing material 717 to the walls of metal container 603. From there, heat is dissipated to surrounding air through cooling fins 803, disposed about a substantial portion of the outer surface of metal container 603. As discussed above, air is circulated through the dockable equipment container, entering via passages 611.

Since cooling air from an environment containing contaminants hostile to disk drives or electronic equipment may enter through the dockable equipment container passages 611, the metal container 603 is environmentally sealed. As discussed above, sealing about the screws which secure the disk drives 711 or other equipment to the walls of metal container 603 is achieved by placement and compression of the energy absorbing material 717 about the screws. Sealing of the halves of the metal container 603 is achieved by means of O-ring 805 and a fragmentary O-ring (FIG. 7, 719). O-ring 805 prevents infiltration about the entire periphery of the metal container 603, while the fragmentary O-ring (FIG. 7, 719) provides a suitable, resilient seal where the ribbon cable (FIG. 7, 715) passes through metal container 603.

Finally, in FIG. 8, the outer shell halves 601a and 601b are seen to have finger joints 807 along line 606. Such joints help prevent undesired movement of the edges defining line 606 with respect to each other. Any suitable method of accomplishing this, such as bonding of the edges or other types of joints may be substituted by those skilled in this art.

Figure 9:
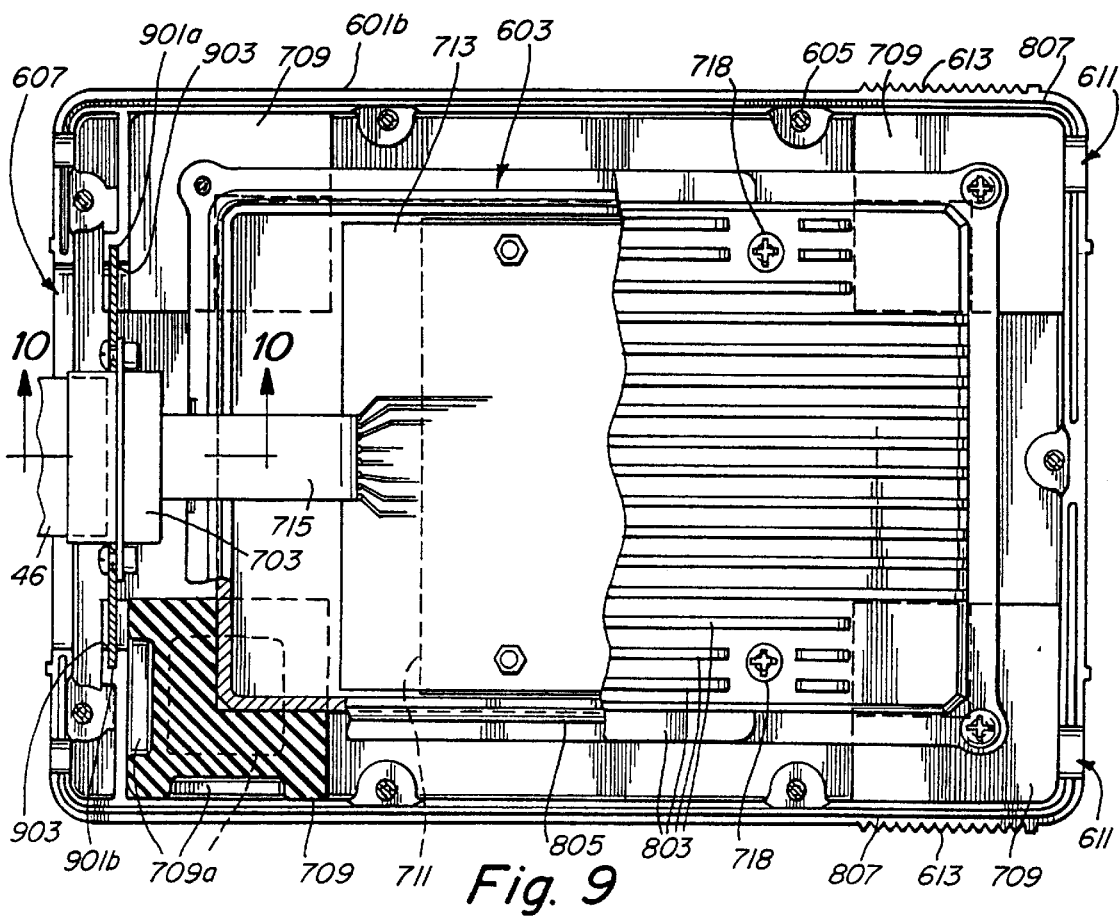
FIG. 9 is a top plan cross-sectional view, taken along line 9—9 of FIG. 7, with certain elements further broken away.

The top plan cross-sectional view of FIG. 9 further illustrates the relationships among the components of the dockable equipment container discussed above. The metal container 603 is suspended at its corners by energy absorbing blocks 709. The metal container 603 and energy absorbing blocks 709 are housed within a durable, plastic outer shell 601b, having passages (FIG. 6, 611) for air movement therethiough. The metal container 603 includes cooling fins 803, which dissipate heat generated by disk drives 711 or other electronic equipment to the air which the passages allow to move through the dockable equipment container. The disk drives 711 may be connected to external equipment through a circuit board 713. In the case of disk drives, the circuit board 713 performs striping, to increase the data storage and retrieval rate. The circuit board 713 is in turn connected through a ribbon cable 715, which is terminated at a connector 703. Here, the connector 703 is shown mated to a corresponding connector 46 of some external equipment (not shown).

Some features not previously discussed include the mounting of the connector 703 and the form of the energy absorbing blocks 709. The connector 703 is mounted conventionally to a flat metal plate 901. The edges 901*a* and 901*b* of the metal plate 901 are then captured in a groove 903 provided in each of the outer shell halves. Thus, assembly and disassembly are greatly simplified, because the detail work of mounting the connector 703 to the metal plate 901 may be done outside of the somewhat more cumbersome outer shell halves 601*a* and 601*b*. The energy absorbing blocks 709 include dished out portions 709*a*.

Figure 11:
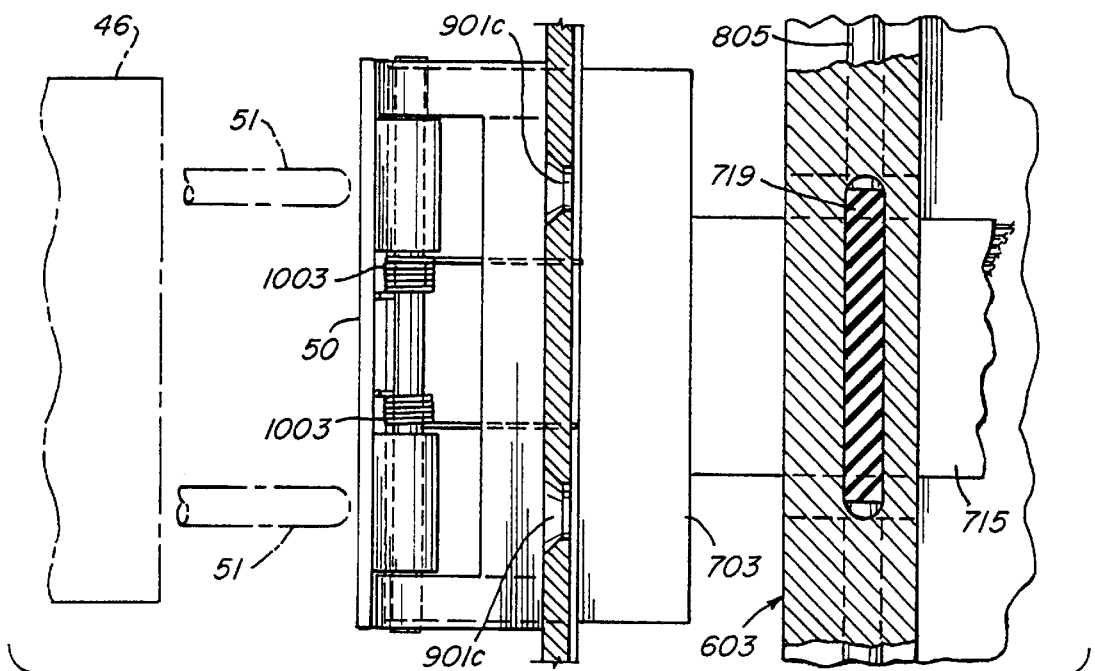
FIG. 11 is a fragmentary cross-sectional view taken along line 11—11 of FIG. 10.
Figure 12:
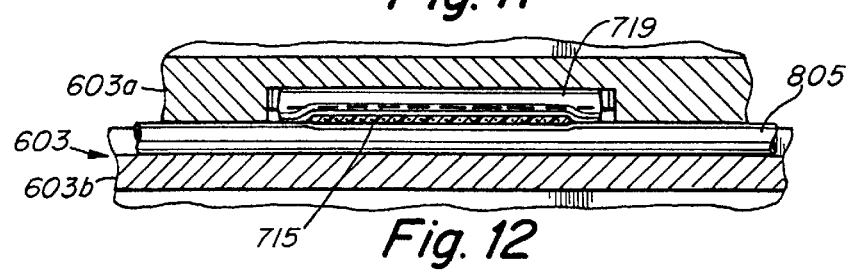
FIG. 12 is a fragmentary cross-sectional view taken along line 12—12 of FIG. 10.

Mating of the connector 703 and sealing of the region of the metal container 603 through which the ribbon cable 715 passes are next discussed in connection with FIGS. 10–12. In order to assure proper mating of the connector 703, it is preferably substantially centered on the axes of the face of the dockable equipment container on which it is located. In the illustrated embodiment, the axes are a long axis of substantially 4¼" and a short axis of substantially 2¾". The long axis of the connector 703 is aligned with the long axis of the dockable equipment container face on which it is located.

Figure 10:
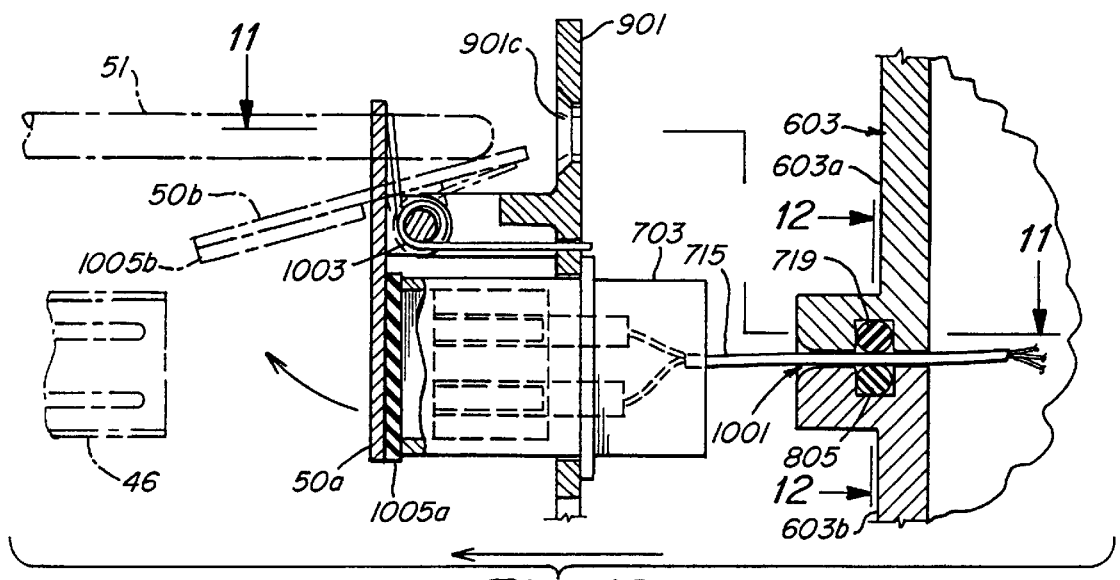
FIG. 10 is an enlarged fragmentary cross-sectional view taken along line 10—10 of FIG. 9.

FIG. 10 illustrates the principal components involved in mating the connector 703 with a corresponding connector 46 in external equipment. Equipment within the dockable equipment container communicates with external equipment through a ribbon cable 715 and a connector 703. The ribbon cable 715 passes through an environmentally sealed aperture 1001 in the metal container 603. The connector 703 is mounted to a mounting plate 901, which is captured in a fixed location within the dockable equipment container, as discussed above. The mounting plate 901 includes guide holes 901*c* which cooperate with alignment pins 51 in the external equipment to properly position the connector 703 for mating with corresponding connector 46. Hingedly attached to the mounting plate 901 is the protective door 50*a*, which covers the end of connector 703 when the dockable equipment container is not connected to external equipment. The protective door 50*a* is held in its normally closed position by one or more springs 1003. A resilient pad 1005*a* may be provided on protective door 50*a* to make a good seal with connector 703 when the protective door 50*a* is closed.

As the dockable equipment container approaches a mated position within some external equipment, the alignment or guide pins 51 affixed adjacent the corresponding connector 46 of the external equipment operate the protective door from a closed position 50*a* to an open position 50*b*. The protective door 50*a* includes an end disposed in intersection with the path taken by the guide pins 51 on the way to the guide holes 901*c*. When the guide pins 51 pass through the location of the end of the protective door 50*a*, the protective door 50*a* is pivoted against the resistance presented by the spring to an open position 50*b*. The guide pins 51 then enter the guide holes 901*c*, which are arranged to position the connector 703 in alignment for mating with the corresponding connector 46. The connectors are then mated. When the dockable equipment container is later withdrawn, the protective door 50*b* returns to the closed position 50*a*, under the influence of the springs 1003.

The environmental seal around the ribbon cable is provided by the O-ring 805 and the fragmentary O-ring 719. As seen in FIGS. 11 and 12, the ribbon cable 715 passes between the fragmentary O-ring 719 and the O-ring 805. Thus, the space between the ribbon cable 715 and the metal container 603, both of which are relatively unyielding, is filled with a yielding material which provides an environmental seal.

Referring now to FIG. 133, which is an exploded view of a cartridge including a first outer shell 601*a* and a second outer shell 601*b*, which are adapted to meet each other along edges 807. A mounting plate 901 carrying a connector 703 is adapted to be placed in the notch 903. The connector 703 is connected to a metal container 603, referred to in connection with this embodiment as a media package 603, via a ribbon cable 715. Printed circuit board 713, provided within the media package 603, includes circuitry to divide an incoming data stream into two data streams to two separate media devices 711 or to combine two outgoing data streams from the two separate media devices 711 found in media package 603, which will be described below. This division and combination is the process called striping discussed above. Each of the corners of the media package 603 is captured by a block 709 shock and vibration absorbing material which may be a material bearing the product name called SORBATHANE, available from Sorbathane, of Kent, Ohio. Such a material is a polyurethane elastomer such as described in U.S. Pat. Nos. 4,346,205, 4,476,258, 4,777,739, and 4,808,469.

Two disk drives 711 are contained within one media package 603. The preferably is a thin, thermally conductive pad 717 disposed between each disk drive 711 and the media package wall, to direct heat away from the disk drives 711. Cooling fins 803 are provided on various faces of the media package 603. The ribbon cable 715 communicates between the interior and exterior of the media package 603 through an aperture 1001 at one end.

The media package itself is of a clamshell design, including a first inner shell 603*a* and a second inner shell 603*b*. The clamshell is environmentally and electrically sealed, when closed. Environmental sealing is achieved by gaskets. The first inner shell 603*a* includes a continuous groove and gasket 805 in a mating surface. The second inner shell 603*b* has a flat mating surface for mating with the gasket 805, except where the ribbon cable 715 passes through the aperture 1001. The gasket (FIG. 7, 719) in the second inner shell 603*b* is provided to complete a seal at the aperture 1001.

The disk drives 711 (and associated signal processing circuitry) should be able to record video and audio data streams at sustained rates of typically four (4) megabytes per second (MBps). At present, the TravelStar LP disk drive, having a diameter of 2½ inches and a capacity of 720 MB is available from IBM Corporation of Yorktown Heights, New York, and is the recording medium of one embodiment of the invention. Disk drives of increased capacity will become readily available in the future, thus increasing the possible recording time of the device. For example, disk drives of 1.2 gigabytes are now available, thus giving a capacity of 2.4 gigabytes in this device. A 2.4 gigabyte device can hold about 15–20 minutes of broadcast quality video and audio. Two such disk drives are combined to form the media package 603. Of course, instead of a magnetic disk drive, any number of other types of digital random-access storage media may be used, such as optical drives, magneto-optical drives, DRAMs, flash memories, etc.

Figure 14:
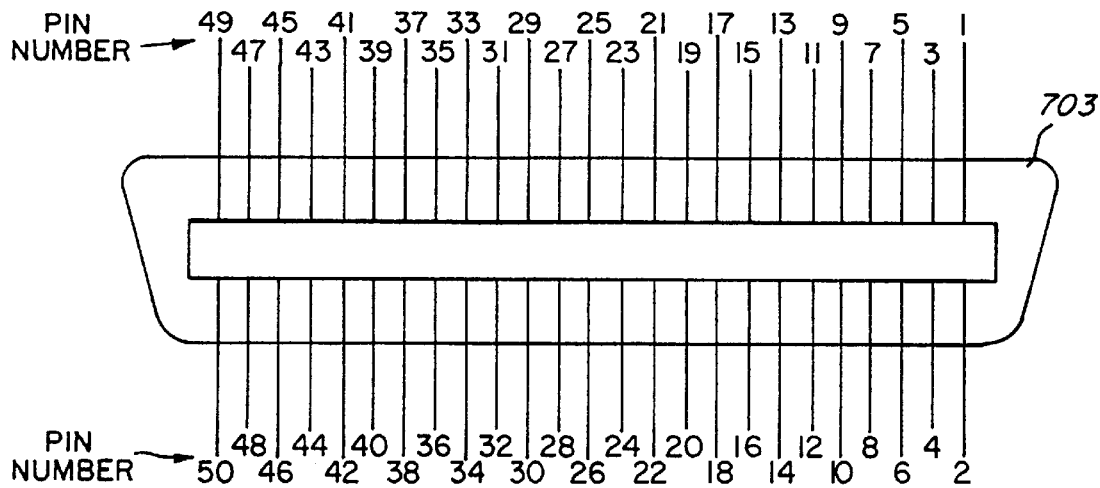
FIG. 14 is a face view of a female connector used in one embodiment of the invention.

The connector may be a 50-pin connector made by AMP under the part number 96-2253-1-1. The signals applied to the connector are those defined by the IDE bus specification, known to those in the disk drive arts, but with a number of modifications to suit the present video recording application. The pins and signals are arranged as indicated in Table 1. Pin numbering is illustrated in FIG. 14, which is a face view of the female connector 703, used in the dockable equipment container.

Although the signals used in the interface defined herein comply with a modified IDE specification, the equipment contained within the dockable equipment container need not be disk drives. Rather, the dockable equipment container could contain, for example, circuits for encapsulating IDE disk drive commands in a message format suitable for high frequency wireless communication to a remote station. The remote station could then include circuits for unencapsulating the IDE disk drive commands and delivering them to a disk drive or other suitable equipment capable of interpreting such commands.

The modified IDE bus signals function are now described. Equipment attached to the bus is addressed via the group of signals ADDR(5:0). When a piece of equipment is addressed, data may be transferred to and from that equipment via the data lines DATA(15:0). When a controller on the circuit board inside the dockable equipment container requests an interrupt for one of the disk drives in the container, the interrupt appears on S_HIRQ_(1:00). The signal DISK_PRESENT denotes whether a disk is present in the container. The disk receives a 13.5 megahertz clock on CLK13. Program code may be downloaded to the controller in the container, by asserting the D_PROG signal. Disk drives are capable of performing several commands. These are indicated by the conditions of the signals CMD_TYPE (1:0). When a data transfer is in progress, the TRANS_ACT signal is asserted. The signal WODRD_AVAIL is used by programmed input output to indicate that another data word is available for transfer. THROTTLE may be asserted to slow down transfers, by imposing a wait. When performing direct memory access (DMA) transfers, the FIFO_AVAIL signal serves as a handshake indicating that more data may be transferred. Also during DMA transfers, the FIFO_ACK signal indicates in response to a transfer request that data may be transferred. Finally, the condition of the RW signal indicates whether the bus is transferring data to or from the dockable equipment container.

Figure 15:
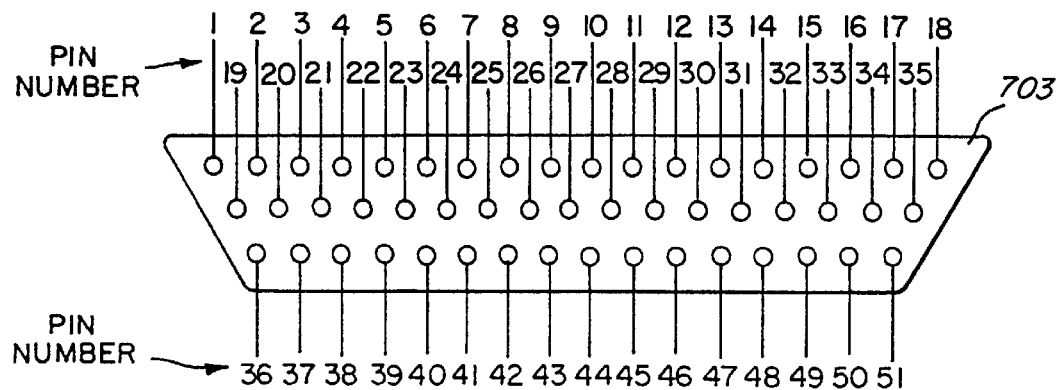
FIG. 15 is a face view of a female connector used in another embodiment of the invention.

The connector may alternatively be a 51-pin D-sub connector made by MIL-E-CON under the part number MCE-51S-0091. The signals applied to the connector are also those defined by the IDE bus specification, but with some different modifications to suit the present video recording application. The pins and signals are arranged as indicated in Table 2. Pin numbering is illustrated in FIG. 15, which is a face view of the female connector 703, used in the dockable equipment container. The modified IDE bus of this embodiment functions similarly to the embodiment discussed above.

TABLE 1

| Pin Number | Signal Name | Pin Number | Signal Name |
| --- | --- | --- | --- |
| 1 | $V_{CC}$ | 26 | ADDR(5) |
| 2 | $V_{CC}$ | 27 | $V_{CC}$ |
| 3 | DATA(0) | 28 | $V_{CC}$ |
| 4 | DATA(1) | 29 | S_HIRQ(0) |
| 5 | DATA(2) | 30 | S_HIRQ(1) |
| 6 | DATA(3) | 31 | CMD_TYPE(0) |

TABLE 1-continued

| Pin Number | Signal Name | Pin Number | Signal Name |
| --- | --- | --- | --- |
| 7 | DATA(4) | 32 | CMD_TYPE(1) |
| 8 | DATA(5) | 33 | TRANS_ACT |
| 9 | DATA(6) | 34 | READY |
| 10 | DATA(7) | 35 | FIFO_AVAIL |
| 11 | DATA(8) | 36 | FIFO_ACK |
| 12 | DATA(9) | 37 | WORD_AVAIL |
| 13 | DATA(10) | 38 | RW |
| 14 | DATA(11) | 39 | $V_{CC}$ |
| 15 | DATA(12) | 40 | N/C |
| 16 | DATA(13) | 41 | DISK_PRESENT |
| 17 | DATA(14) | 42 | SPIN_RST |
| 18 | DATA(15) | 43 | N/C |
| 19 | GND | 44 | N/C |
| 20 | GND | 45 | N/C |
| 21 | ADDR(0) | 46 | GND |
| 22 | ADDR(1) | 47 | GND |
| 23 | ADDR(2) | 48 | CLK13 |
| 24 | ADDR(3) | 49 | GND |
| 25 | ADDR(4) | 50 | GND |

TABLE 2

| Pin Number | Signal Name | Pin Number | Signal Name |
| --- | --- | --- | --- |
| 1 | S_HIRQ(0) | 27 | DATA(9) |
| 2 | $V_{CC}$ | 28 | DATA(7) |
| 3 | TORCH_R_W | 29 | DATA(5) |
| 4 | N/C | 30 | GND |
| 5 | N/C | 31 | ADDR(3) |
| 6 | DATA(14) | 32 | S_HIRQ(1) |
| 7 | ADDR(5) | 33 | ADDR(2) |
| 8 | DATA(13) | 34 | S_CLK |
| 9 | DATA(8) | 35 | S_D_{IN} |
| 10 | $V_{CC}$ | 36 | CMD_TYPE(1) |
| 11 | DISK_PRESENT | 37 | FIFO_AVAIL |
| 12 | DATA(2) | 38 | GND |
| 13 | DATA(0) | 39 | SPIN_RST |
| 14 | CLK13 | 40 | FIFO_ACK |
| 15 | ADDR(0) | 41 | DATA(15) |
| 16 | ADDR(1) | 42 | DATA(10) |
| 17 | GND | 43 | GND |
| 18 | D_PROG | 44 | DATA(6) |
| 19 | CMD_TYPE(0) | 45 | DATA(4) |
| 20 | TRANS_ACT | 46 | DATA(3) |
| 21 | WORD_AVAIL | 47 | DATA(1) |
| 22 | READY | 48 | ADDR(4) |
| 23 | THROTTLE | 49 | $V_{CC}$ |
| 24 | $V_{CC}$ | 50 | N/C |
| 25 | DATA(12) | 51 | S_DONE |
| 26 | DATA(11) | | |

Figure 16:
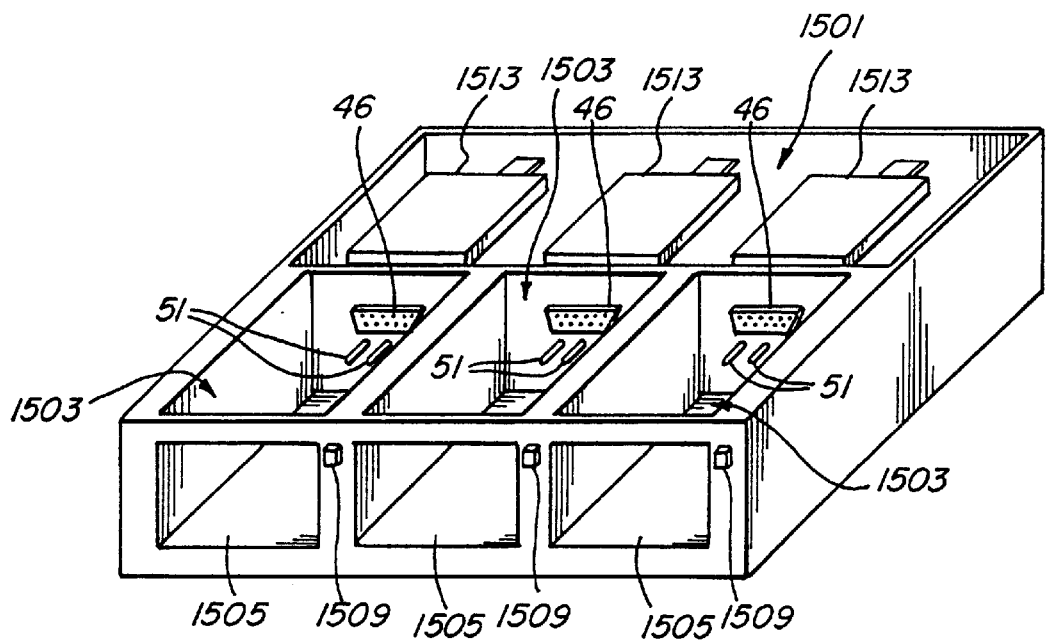
FIG. 16 is a perspective view of a docking rack in which the dockable equipment container may be used.
Figure 17:
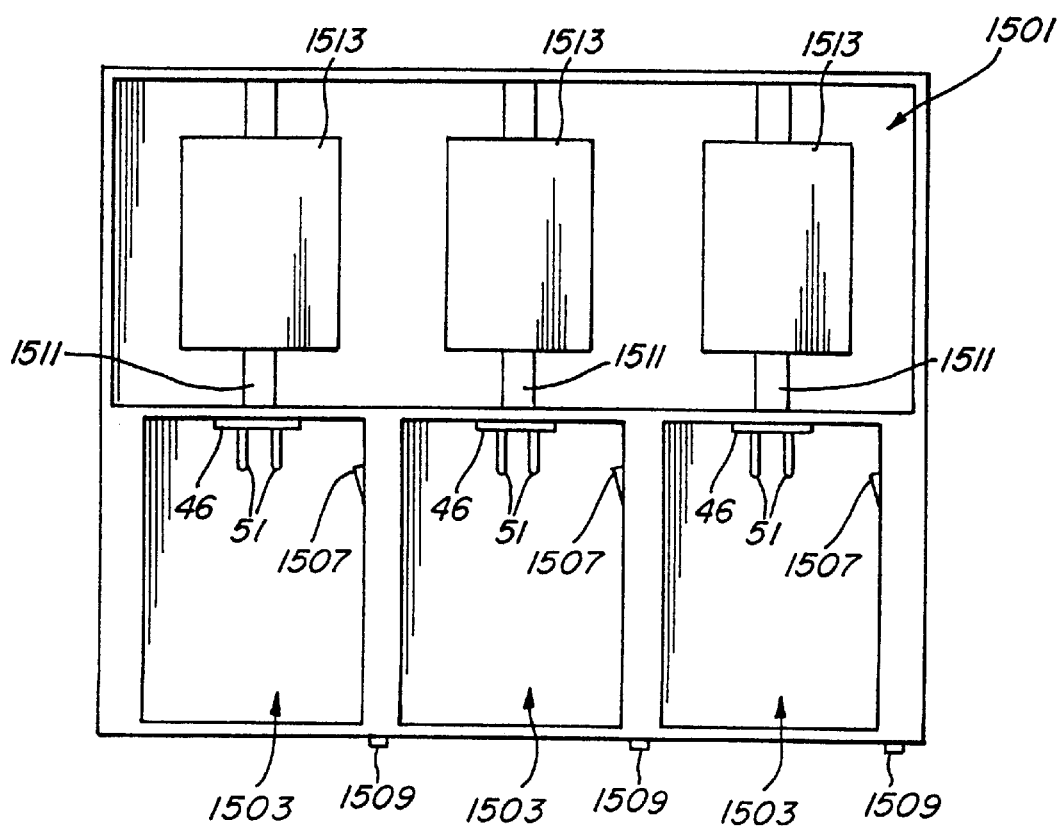
FIG. 17 is a top view of the docking rack of FIG. 16.

As shown in FIGS. 16 and 17, the dockable equipment container described above may be used in connection with other types of equipment than the moving picture recording application initially discussed. FIGS. 15 and 16 illustrate a docking station for dockable equipment containers, including an electronics bay 1501 behind each docking port 1503. The docking ports 1503 are arranged for dockable equipment containers to be slid in and out via an opening 1505 at one end of each port 1503. At a far end of each port is the corresponding connector 46 and the alignment or guide pins 51. Also within each docking port 1503 is a catch 1507 operated by a push-button 1509, either mechanically or by electrical solenoid. Since the docking station illustrated does not have doors or other means to prevent the dockcable equipment containers from inadvertently backing out of the docking ports 1503, such a catch 1507 may be desirable to ensure reliable operation of the system. In one embodiment of the docking station, the catch 1507 is located substantially within a range of 1¾"–2" from the far end of the port 1503.

Each corresponding connector 46 may, as shown in this example, be connected by a cable 1511 to a circuit board 1513. Circuit boards 1513 may contain various types of electronic circuitry suitable for processing the IDE bus signals received from and required to be sent to a dockable equipment container, such as described above. For example, if it is desirable to connect the dockable equipment containers to a computer having a small computer systems interface (SCSI) port, then the circuit boards 1513 may be translators between IDE physical signals and commands, and SCSI physical signals and commands.

The present invention has, now been described in connection with a particular embodiment and variations thereof. The embodiment and variations described are provided for illustrative purposes, only. Numerous additional variations and modifications will now be evident to those skilled in this art, which are contemplated to be within the scope of this invention. Thus, the scope of the invention is not intended to be limited by the foregoing description, but rather the scope of the invention is intended to include all subject matter encompassed by the appended claims and the equivalents thereto.

What is claimed is:

1. An electronic equipment container, comprising:

an environmentally sealed metal container having a passage through which an electrical cable communicates, the metal container further including means for removing heat from an interior portion thereof;

an outer shell of impact-resistant material;

a plurality of energy-absorbent cushions positioned between the outer shell and the metal container, suspending the container within the outer shell; and a connector positioned at an end of the shell, the electrical cable terminated at the connectors, wherein the connector includes:

an electrical, connector; and a mounting plate on which the electrical connector is mounted, the mounting plate further having a guide hole into which a mating guide pin fits, wherein the mounting plate has edges captured within a groove at one end of the outer shell.

2. The device of claim 1, wherein the plurality of cushions comprise:

blocks of material, each having an outer convex corner and an inner concave corner, the outer corner fitting into a corner of the center shell and the inner corner fitting on a corner of the container.

3. The device of claim 2, wherein the cushions are composed essentially of a polyurethane elastomer.

4. The device of claim 3, where the elastomer is a flexible polyurethane of essentially linear structure containing unsatisfied hydroxyl groups, and having a compression set less than 15%, anm elongation at break of at least 500%, and a recovery which is delayed after compression by at least 0.7 seconds.

5. The device of claim 1, wherein the outer shell includes edges defining apertures therethrough, and wherein the means for removing heat further comprises:

fins disposed on an exterior surface of the metal container.

6. The device of claim 5, wherein the means for removing heat further comprises:

high heat transfer material disposed on an interior surface of the metal container.

7. The device of claim 6, further comprising:

a disk drive mounted in the metal container in contact with the high heat transfer material.

8. The device of claim 7, wherein the high heat transfer material is energy absorbing.

9. The device of claim 6, further comprising:

communication equipment mounted in the metal container in contact with the high heat transfer material.

10. The device of claim 1, wherein the connector further comprises:

a protective cover, rotatable mounted to protect the connector when closed, an end of the cover being positioned in a path of a part of a receptacle into which the device is received, whereby the cover is operated from a closed position to an open position by passage of the part along the path.

11. The device of claim 1, wherein the outer shell end at which the mounting plate edges are captured has a long axis of substantially 4¼", a short axis of substantially 2¾", and the connector substantially centered on the axes.

12. The device of claim 11, wherein the connector is a 51-pin D-sub connector.

13. The device of claim 11, wherein the connector comprises:

a first row of pins numbered 1–18;

of pins numbered 19–35; and a third row of pins numbered 36–50; the pinout defined by:

| Pin Number | Signal Name | Pin Number | Signal Name |
|---|---|---|---|
| 1 | V_CC | 26 | ADDR(5) |
| 2 | V_CC | 27 | V_CC |
| 3 | DATA(0) | 28 | V_CC |
| 4 | DATA(1) | 29 | S_HIRQ(0) |
| 5 | DATA(2) | 30 | S_HIRQ(1) |
| 6 | DATA(3) | 31 | CMD_TYPE(0) |
| 7 | DATA(4) | 32 | CMD_TYPE(1) |
| 8 | DATA(5) | 33 | TRANS_ACT |
| 9 | DATA(6) | 34 | READY |
| 10 | DATA(7) | 35 | FIFO_AVAIL |
| 11 | DATA(8) | 36 | FIFO_ACK |
| 12 | DATA(9) | 37 | WORD_AVAIL |
| 13 | DATA(10) | 38 | RW |
| 14 | DATA(11) | 39 | V_CC |
| 15 | DATA(12) | 40 | N/C |
| 16 | DATA(13) | 41 | DISK_PRESENT |
| 17 | DATA(14) | 42 | SPIN_RST |
| 18 | DATA(15) | 43 | N/C |
| 19 | GND | 44 | N/C |
| 20 | GND | 45 | N/C |
| 21 | ADDR(0) | 46 | GND |
| 22 | ADDR(1) | 47 | GND |
| 23 | ADDR(2) | 48 | CLK13 |
| 24 | ADDR(3) | 49 | GND |
| 25 | ADDR(4) | 50 | GND |

14. The device of claim 11, wherein the connector is a two-row, 51-pin including pins numbered 1–51 by odd numbers and another row including pins numbered 2–50 by even numbers, the pinout defined by:

| Pin Number | Signal Name | Pin Number | Signal Name |
|---|---|---|---|
| 1 | S_HIRQ(0) | 27 | DATA(9) |
| 2 | V_CC | 28 | DATA(7) |
| 3 | TORCH_R_W | 29 | DATA(5) |
| 4 | N/C | 30 | GND |
| 5 | N/C | 31 | ADDR(3) |
| 6 | DATA(14) | 32 | S_HIRQ(1) |
| 7 | ADDR(5) | 33 | ADDR(2) |

-continued

| Pin Number | Signal Name | Pin Number | Signal Name |
|---|---|---|---|
| 8 | DATA(13) | 34 | S_CLK |
| 9 | DATA(8) | 35 | S_D$_{IN}$ |
| 10 | V$_{CC}$ | 36 | CMD_TYPE(1) |
| 11 | DISK_PRESENT | 37 | FIFO_AVAIL |
| 12 | DATA(2) | 38 | GND |
| 13 | DATA(0) | 39 | SPIN_RST |
| 14 | CLK13 | 40 | FIFO_ACK |
| 15 | ADDR(0) | 41 | DATA(15) |
| 16 | ADDR(1) | 42 | DATA(10) |
| 17 | GND | 43 | GND |
| 18 | D_PROG | 44 | DATA(6) |
| 19 | CMD_TYPE(0) | 45 | DATA(4) |
| 20 | TRANS_ACT | 46 | DATA(3) |
| 21 | WORD_AVAIL | 47 | DATA(1) |
| 22 | READY | 48 | ADDR(4) |
| 23 | THROTTLE | 49 | V$_{CC}$ |
| 24 | V$_{CC}$ | 50 | N/C |
| 25 | DATA(12) | 51 | S_DONE |
| 26 | DATA(11) | | |

15. The device of claim 11, wherein the outer shell further comprises:

a first outer shell half defining an edge; and a second outer shell half defining an edge adapted to mate with the edge of the first outer shell half;

the first outer shell half secured to the second outer shell half by a plurality of fasteners.

16. The device of claim 15, wherein the first outer shell half has a surface defining a recess through which one of the plurality of fasteners passes the recess located substantially within a range of 1¾"–2" from the outer shell end at which the mounting plate edges are captured.

17. An electronic equipment container for use in a portable digital video camera, the container being removable from the portable digital video camera, the container comprising a recording device for recording digital video information received from the digital video camera, the recording device having a passage through which an electrical cable for receiving the digital video information communicates with the portable digital video camera;

an outer shell of impact-resistant material;

a plurality of energy-absorbent cushions for absorbing shock and vibration positioned between the outer shell and the recording device, suspending the recording device within the outer shell; and a connector positioned at an end of the shell, the electrical cable terminated at the connector.

18. The electronic equipment container of claim 17, wherein the plurality of cushions comprise:

blocks of material, each having an outer convex corner and an inner concave corner, the outer corner fitting into a corner of the center shell and the inner corner fitting on a corner of the recording device.

19. The electronic equipment container of claim 18, wherein the cushions are composed essentially of a polyurethane elastomer.

20. The electronic equipment container of claim 17, wherein the outer shell includes edges defining apertures therethrough.

21. The electric equipment container of claim 17, further including fins disposed on an exterior surface of the recording device for removing heat from the recording device.

22. The electronic equipment container of claim 17, wherein the recording device is a disk drive.

23. The electronic equipment container of claim 17, wherein the connector further comprises:

an electrical connector; and a mounting plate on which the electrical connector is mounted, the mounting plate further having a guide hole into which a mating guide pin fits.

24. The electronic equipment container of claim 17, wherein the connector further comprises:

a protective cover, rotatably mounted to protect the connector when closed, an end of the cover being positioned in a path of a part of a receptacle into which the device is received, whereby the cover is operated from a closed position to an open position by passage of the part along the path.

25. The electronic equipment container of claim 24, wherein the mounting plate has edges captured within a groove at one end of the outer shell.

* * * * *